(12) United States Patent  
Gorringe et al.

(10) Patent No.: US 6,837,739 B2
(45) Date of Patent: Jan. 4, 2005

(54) BATTERY CONNECTION INTERRUPTER

(75) Inventors: Alan Gorringe, Nampa, ID (US); Samuel K. Swenson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/355,759

(22) Filed: Jan. 31, 2003

(65) Prior Publication Data

US 2004/0152356 A1 Aug. 5, 2004

(51) Int. Cl.[7] .............................. H01R 11/20
(52) U.S. Cl. ......................... 439/474; 200/506
(58) Field of Search .................. 439/474, 500, 439/504, 188; 200/506, 61.08, 61.19

(56) References Cited

U.S. PATENT DOCUMENTS

| | | | | | |
|---|---|---|---|---|---|
| 4,232,260 | A | * | 11/1980 | Lambkin | 320/110 |
| 5,558,544 | A | * | 9/1996 | Okada et al. | 439/762 |
| 6,030,722 | A | * | 2/2000 | Kuboshima et al. | 429/178 |
| 6,512,190 | B2 | * | 1/2003 | Leve et al. | 200/506 |
| 6,762,375 | B2 | * | 7/2004 | Haussmann | 200/52 R |
| 6,776,669 | B2 | * | 8/2004 | Krause et al. | 439/772 |

* cited by examiner

Primary Examiner—Gary Paumen
Assistant Examiner—Edwin A. Leon
(74) Attorney, Agent, or Firm—Augustus W. Winfield

(57) ABSTRACT

A battery is inside an enclosure. A shim is inserted between the battery and at least one contact. The shim can be actuated externally without requiring the enclosure to be opened. The shim may be conductive on at least one face to provide a switch function, or may be non-conductive.

10 Claims, 2 Drawing Sheets

BATTERY CONNECTION INTERRUPTER

FIELD OF INVENTION

This invention relates generally to electrical battery holders and battery powered electronic devices.

BACKGROUND

Battery powered electronic devices, for example, digital cameras, portable telephones, and portable computers, often have some active circuitry that continues to receive power even when a power switch is switched off. For example, a real-time clock circuit, or keyboard activity monitoring circuitry, may continue to remain active when the rest of a device is powered off. If a device is left powered off for an extended time without recharging the batteries, the active circuitry may completely discharge the batteries. For some battery technologies, if the battery is fully discharged, the battery may leak corrosive fluids into the device being powered. For some battery technologies, the ability of the battery to be recharged is impaired if the battery is allowed to fully discharge. Accordingly, manufacturers of some battery powered electronic devices recommend that if the devices are going to be unused for an extended period of time then the batteries should be removed.

In some battery-powered electronic devices, a reset function is needed. Sometimes an electrical reset switch is provided that grounds a reset signal on a processor. In some devices, the manufacturer recommends removing the batteries to provide a power-on reset function. Some battery powered electronic devices have a capacitive energy storage device that provides power when the batteries are removed. If, for example, the device has a real-time clock, this enables the batteries to be replaced without having to reset the clock. If a power-on reset is needed, capacitor discharge time may be a substantial number of minutes. Accordingly, manufacturers of some battery powered electronic devices recommend that if a power-on reset is needed, then the batteries should be removed for an extended period of time.

Removal of batteries is an inconvenience to a customer. Battery removal may require removal of screws or covers. There is a risk of misplacing or losing batteries, screws, and covers. There is a risk of damage to covers and internal parts. There is a need for a convenient way to prevent battery discharge, and to provide a power-on reset function, without requiring physical removal of batteries.

SUMMARY

A shim is inserted between a battery and at least one contact. The shim can be actuated externally without requiring access to a battery compartment. The shim may be conductive on at least one face to provide a switch function, or may be non-conductive.

DETAILED DESCRIPTION

Figure 1A:
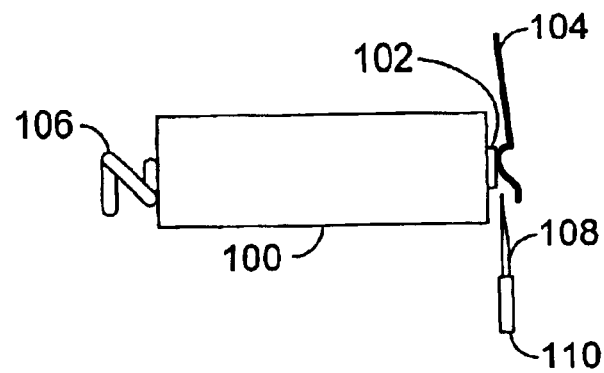
FIG. 1A is a block diagram top view of an example embodiment of a battery with a shim for breaking contact.

FIG. 1A illustrates an example battery 100. The battery has a terminal 102 on one end. Terminal 102 is connected to a contact 104. Contact 104 is connected to other circuitry (not illustrated) powered by the battery. The battery 100 has a second terminal on a second end connected to a second contact 106. A shim 108 can be mechanically inserted between terminal 102 and contact 104 (as illustrated in FIG. 1B), thereby physically breaking the connection between the battery and the circuitry being powered by the battery.

Figure 1B:
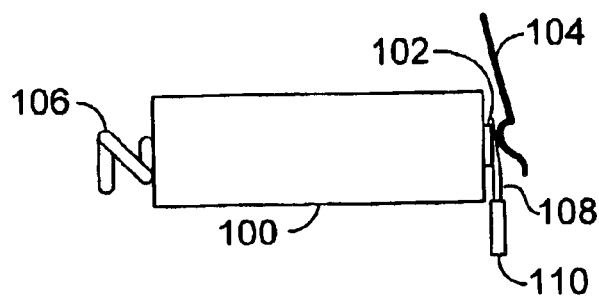
FIG. 1B illustrates the shim of FIG. 1A being actuated so that it breaks at least one contact.
Figure 1C:
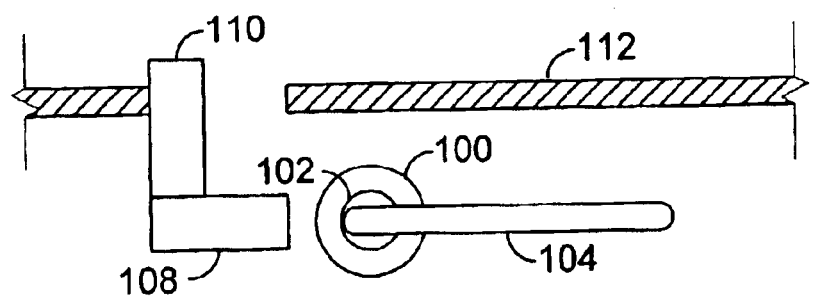
FIG. 1C is a block diagram end view of the battery and shim of FIG. 1A.

FIG. 1C illustrates an end view of the battery compartment. In FIG. 1C, the battery is within an enclosure 112. The shim 108 has a tab portion 110 that extends through an opening in the enclosure. The tab portion 110 may then be used to physically disconnect the battery, from outside the enclosure, without having to open the enclosure to access the battery.

Figure 2:
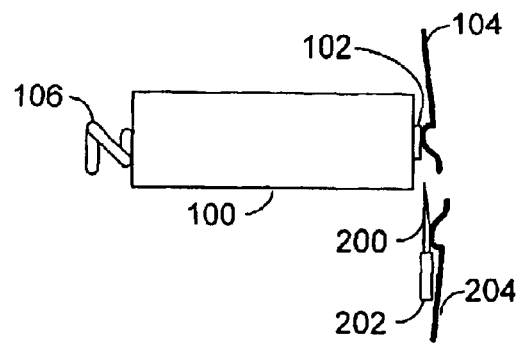
FIG. 2 is a block diagram of an example embodiment of a battery and multiple contacts in which a shim breaks at least one connection and makes at least one connection.

The shim illustrated in FIGS. 1A–1C may also provide a reset function by disconnecting the battery long enough to provide a power-on condition. The circuitry being powered by the battery may include a large storage capacitor (not illustrated). If a power-on reset function is desired, the time required for a power-on reset can be decreased by discharging the storage capacitor. In FIG. 2, an alternative example embodiment of the shim is illustrated. For shim 200, the face of the shim that touches the contact 104 is made conductive. The face of the shim that touches the battery terminal 102 is made non-conductive. The shim 200, when inserted between the battery terminal 102 and contact 104, makes an electrical connection between contact 104 and a conductive member 204, while breaking the electrical connection between the battery terminal 102 and contact 104. The shim 200, when moved to a second position, breaks the connection between contact 104 and conductive member 204, while permitting the battery terminal 102 to connect to contact 104. Conductive member 204, for example, may be connected (directly or through a resistance) to ground, or other appropriate power potential, to discharge any capacitance connected to contact 104. Conductive member 204 may be a contact for sliding connection as illustrated in FIG. 2. As an alternative, conductive member 204 may be a wire that is fastened directly to the conductive face of the shim 200.

Figure 3:
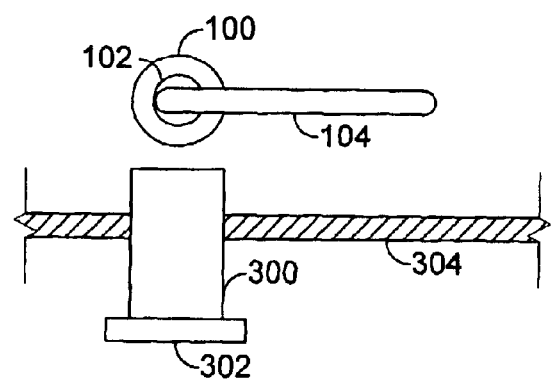
FIG. 3 is a block diagram end view of a battery and an example embodiment of a shim implemented as a push/pull device.
Figure 4:
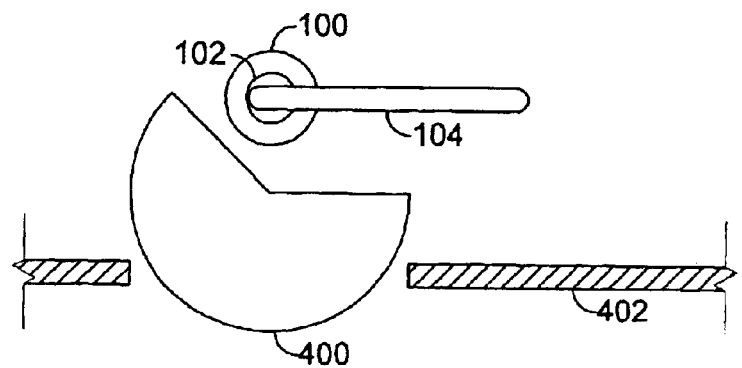
FIG. 4 is a block diagram end view of a battery and an example embodiment of a shim implemented as a rotating device.

The shim in FIGS. 1A–1C and FIG. 2 is depicted as a sliding device. As an alternative, the shim can be implemented as a push/pull device. In FIG. 3, a shim 300 with tab 302 may be pushed into the enclosure 304 to break battery contact and pulled from the enclosure to make battery contact. Shim 300 may be removable, or captured. As still another alternative, the shim can be implemented as a rotating device. In FIG. 4, a shim 400 may be rotated to make or break battery contact. The shim 400 extends through an opening in an enclosure 402.

The battery, terminals, and contacts depicted in FIGS. 1A–1C and FIGS. 2–4 are examples for purposes of illustration only. The battery may have two terminals on one end. Contacts may comprise any of a large variety of shapes as is well known in the industry. There may also be multiple batteries. The shim may make and break multiple connections.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus, comprising:
   an enclosure;
   a battery, inside the enclosure, having a terminal;
   a contact; and
   a shim, which can be actuated externally to the enclosure, such that in a first position of the shim the contact presses against the terminal, and in a second position of the shim the shim is inserted between the terminal and the contact, breaking an electrical connection between the terminal and the contact.

2. The apparatus of claim 1, where the shim slides substantially parallel to a surface of the enclosure.

3. The apparatus of claim 1, where the shim rotates.

4. The apparatus of claim 1, where the contact is a first contact, further comprising:
   a conductive member, electrically connected to the shim, so that when the shim is in the second position the shim makes an electrical connection between the first contact and the conductive member.

5. The apparatus of claim 4, where the conductive member is a sliding contact.

6. The apparatus of claim 4, where the conductive member is attached to the shim.

7. The apparatus of claim 1, where the shim moves substantially perpendicular to a surface of the enclosure.

8. The apparatus of claim 7, where the shim is removable.

9. A method, comprising:
   actuating, from outside an enclosure, a shim that is at least partially internal to the enclosure, causing the shim to be inserted between a battery terminal and a contact, where the battery terminal and the contact are internal to the enclosure, thereby breaking an electrical connection between the battery terminal and the contact.

10. The method of claim 9, further comprising:
    making an electrical connection, through the shim, between the contact and a conductive member.

* * * * *